United States Patent
Shi

(10) Patent No.: US 10,747,344 B2
(45) Date of Patent: Aug. 18, 2020

(54) FLEXIBLE TOUCH SCREEN AND MANUFACTURING METHOD THEREOF, DISPLAY SCREEN AND MANUFACTURING METHOD THEREOF, AND DISPLAY DEVICE

(71) Applicant: BOE TECHNOLOGY GROUP CO., LTD., Beijing (CN)

(72) Inventor: Shiming Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 305 days.

(21) Appl. No.: 15/746,796

(22) PCT Filed: Jun. 28, 2017

(86) PCT No.: PCT/CN2017/090447
§ 371 (c)(1),
(2) Date: Jan. 22, 2018

(87) PCT Pub. No.: WO2018/120693
PCT Pub. Date: Jul. 5, 2018

(65) Prior Publication Data
US 2020/0081562 A1    Mar. 12, 2020

(30) Foreign Application Priority Data
Dec. 29, 2016 (CN) .......................... 2016 1 1246021

(51) Int. Cl.
*G06F 3/041* (2006.01)

(52) U.S. Cl.
CPC .... *G06F 3/041* (2013.01); *G06F 2203/04102* (2013.01); *G06F 2203/04103* (2013.01)

(58) Field of Classification Search
CPC ........................................................ G06F 3/041
(Continued)

(56) References Cited

U.S. PATENT DOCUMENTS 10,168,732 B2 * 1/2019 Hung .................... G06F 1/1615
2013/0215011 A1 * 8/2013 Ke ............................ G06F 3/03
345/156

(Continued)

FOREIGN PATENT DOCUMENTS

CN       203616560 U     5/2014
CN       105720062 A     6/2016

(Continued)

OTHER PUBLICATIONS

International Search Report and Written Opinion received for PCT Patent Application No. PCT/CN2017/090447, dated Oct. 11, 2017, 13 pages (5 pages of English Translation and 8 pages of Original Document).

(Continued)

*Primary Examiner* — Prabodh M Dharia
(74) *Attorney, Agent, or Firm* — Womble Bond Dickinson (US) LLP

(57) ABSTRACT

The present application discloses a flexible touch screen. The flexible touch screen comprises: a first region, the first region comprising touch electrodes and detection electrodes in a cross distribution, the first region being non-foldable; and a second region adjacent to the first region, the second region comprising touch electrodes and detection electrode in a parallel distribution, the second region being foldable. The present application further discloses a flexible display screen, a display device, a display method for a flexible display screen and a method for manufacturing a flexible touch screen.

18 Claims, 3 Drawing Sheets

(58) Field of Classification Search
USPC .......... 345/156, 173, 174; 361/749; 349/12
See application file for complete search history.

(56) References Cited

U.S. PATENT DOCUMENTS

| | | | |
|---|---|---|---|
| 2013/0342439 A1 | 12/2013 | Kwack et al. | |
| 2014/0132553 A1 | 5/2014 | Park et al. | |
| 2014/0152910 A1* | 6/2014 | Kang | G06F 1/1643 349/12 |
| 2015/0022732 A1* | 1/2015 | Park | G06F 3/044 349/12 |
| 2015/0146387 A1* | 5/2015 | Lee | G06F 1/1679 361/749 |
| 2015/0241924 A1 | 8/2015 | Chang et al. | |
| 2015/0242022 A1 | 8/2015 | Hung et al. | |
| 2016/0085319 A1* | 3/2016 | Kim | G06F 3/0346 345/156 |
| 2016/0170523 A1 | 6/2016 | Park et al. | |
| 2016/0202831 A1 | 7/2016 | Kim et al. | |
| 2016/0271914 A1 | 9/2016 | Xie | |
| 2016/0291780 A1 | 10/2016 | Namkung | |
| 2016/0293870 A1* | 10/2016 | Nakagawa | H01L 51/0097 |
| 2016/0306462 A1 | 10/2016 | Park et al. | |
| 2016/0372083 A1 | 12/2016 | Taite et al. | |
| 2016/0378231 A1* | 12/2016 | Kim | G06F 3/044 345/174 |
| 2017/0223821 A1 | 8/2017 | Wang | |
| 2017/0242515 A1* | 8/2017 | Son | G06F 3/0412 |
| 2018/0095574 A1* | 4/2018 | Kim | H01L 41/1132 |
| 2018/0120615 A1* | 5/2018 | Wang | G02F 1/13338 |
| 2018/0164923 A1* | 6/2018 | Hirabayashi | G09F 9/30 |
| 2019/0258295 A1* | 8/2019 | Fujimoto | G06F 1/1652 |

FOREIGN PATENT DOCUMENTS

| | | |
|---|---|---|
| CN | 105786237 A | 7/2016 |
| CN | 105929993 A | 9/2016 |
| CN | 106055137 A | 10/2016 |
| CN | 206331403 U | 7/2017 |
| KR | 10-2014-0000423 A | 1/2014 |
| KR | 10-2014-0062269 A | 5/2014 |
| KR | 10-2016-0072909 A | 6/2016 |
| KR | 10-2016-0119934 A | 10/2016 |

OTHER PUBLICATIONS

International Preliminary Report on Patentability received for PCT Patent Application No. PCT/CN2017/090447, dated Jul. 11, 2019, 12 pages (7 pages of English Translation and 5 pages of Original Document).
Office Action received for Korean Patent Application No. 10-2018-7002627, dated May 13, 2019, 14 pages (7 pages of English Translation and 7 pages of Office Action).
"Partial Supplementary European Search Report," EP Application No. 17829906.1, dated Jun. 2, 2020 (12 pages).

* cited by examiner

FLEXIBLE TOUCH SCREEN AND MANUFACTURING METHOD THEREOF, DISPLAY SCREEN AND MANUFACTURING METHOD THEREOF, AND DISPLAY DEVICE

RELATED APPLICATION(S)

The present application is the U.S. national phase entry of PCT/CN2017/090447, with an international filing date of Jun. 28, 2017, which claims the priority of the Chinese patent application No. 201611246021.7 filed on Dec. 29, 2016, the entire content of which is incorporated herein by reference.

TECHNICAL FIELD

The present application relates to the field of display, particularly to a flexible touch display and manufacturing method thereof, a flexible display screen and display method thereof, as well as a display device comprising the flexible display screen.

BACKGROUND

Flexible display is a popular technical direction in recent years. For example, electronic paper, organic light emitting diodes (OLED), and a reflective-type of liquid crystals all can be used for flexible display. Particularly, the active matrix organic light emitting diode (AMOLED) is more benefit for manufacturing a thin and flexible device. In the meanwhile, it further has advantages such as active luminescence, better display effect, and high contrast. Hence, it has the most promising future in the flexible display technology. With development of the flexible display technology, the bending radius of the flexible AMOLED is smaller and smaller. At present, a foldable flexible display has been achieved.

Because the flexible display screen has a multilayer stack structure, the most critical devices (such as TFT, OLED) have to be arranged in the intermediate layer of the stack structure, enabling it to suffer the minimum force. When the touch screen is arranged above the display screen, the touch screen is relatively far from the intermediate layer. Hence, requirements on the material for manufacturing the touch screen will be higher. In the prior art, the touch screen generally uses materials such as ITO, metal, and inorganic insulating layer. These materials are intolerant to bending, such that the touch screen comprising these materials may be easily damaged when being bended.

SUMMARY

In order to overcome problems such as that the touch screen may be easily damaged when being bended, the present application proposes a new type of flexible display screen. By dividing the display screen into different regions, not only different display modes can be used when unfolding and folding the display screen so as to avoid misoperation, but also the touch screen in the display screen can be protected from being damaged when being bended.

According to an aspect of the present application, a flexible touch screen is proposed. The flexible touch screen comprises: a first region, the first region comprising touch electrodes and detection electrodes in a cross distribution, the first region being non-foldable; and a second region adjacent to the first region, the second region comprising touch electrodes and detection electrode in a parallel distribution, the second region being foldable.

According to an embodiment, the second region can be located in a foldable region of the flexible touch screen.

According to an embodiment, the first region can be located in two side regions of the flexible touch screen, and the second region can be located in a central region of the flexible touch screen.

According to an embodiment, the first region comprises a double-layer conductive film or a single-layer conductive film having a cross bridge structure; and the second region comprises a single-layer conductive film.

According to an embodiment, the touch electrodes and the detection electrodes in the first region can be distributed perpendicular to each other.

According to an embodiment, an extending direction of the touch electrodes and the detection electrodes in the second region can be parallel to a bending axis of the foldable region of the flexible touch screen.

According to an embodiment, a material of the touch electrode or the detection electrode is one or combination of tin indium oxide, silver nanowire, metal, carbon nanotube, and graphene.

In the flexible touch screen according to the present application, because the second region comprises touch electrodes and detection electrodes in a parallel distribution, the flexible touch screen of the present application may not be damaged easily when being bended.

According to another aspect of the present application, a flexible display screen is proposed, comprising the flexible touch screen according to any of the above embodiments.

According to another aspect of the present application, a display method for the flexible display screen according to the above embodiment is proposed. The flexible display screen comprises a foldable region arranged in a central portion and non-foldable regions arranged at two sides, and the foldable region comprises touch electrodes and detection electrode in a parallel distribution. The display method comprises: when the flexible display screen is not bended, the flexible display screen performing a full screen display, and when the flexible display screen is bended, at least one of the non-foldable regions arranged at two sides not performing display.

According to an embodiment, when the flexible display screen is bended, one of the non-foldable regions arranged at two sides does not perform display, but the other of the non-foldable regions arranged at two sides and the foldable region arranged in the central portion keep displaying, and all displayed contents in the full screen display are remapped to a portion of the flexible display screen that keeps displaying.

According to an embodiment, when the flexible display screen is bended, neither of the non-foldable regions arranged at two sides performs display, and the foldable region arranged in the central portion keeps displaying.

According to an embodiment, the folded region displays time or customized information.

The flexible display screen according to the present application is divided into a foldable region and non-foldable regions, and the foldable region comprises touch electrodes and detection electrodes in a parallel distribution. Therefore, when the flexible display screen according to the present application is folded, the case where the foldable region is damaged may not occur easily. Moreover, when the flexible display screen according to the present application is bended, at least one of the non-foldable regions arranged at two sides can perform no display. Thus, electric power can be saved further.

According to another aspect of the present application, a display device is proposed, comprising the flexible display screen according to any of the above embodiments.

According to another aspect of the present application, a method for manufacturing a flexible touch screen is proposed, comprising steps of: manufacturing a first region, the first region comprising touch electrodes and detection electrodes in a cross distribution, the first region being non-foldable; and manufacturing a second region adjacent to the first region, the second region comprising touch electrodes and detection electrode in a parallel distribution, the second region being foldable.

According to an embodiment, the step of manufacturing the first region can comprise: arranging the touch electrodes and the detection electrodes in the first region to be perpendicular to each other.

According to an embodiment, the step of manufacturing the second region can comprise: arranging the touch electrodes and the detection electrodes in the second region, enabling an extending direction thereof to be parallel to a bending axis of the foldable region of the flexible touch screen.

According to an embodiment, the step of manufacturing the first region can comprise: forming the first region in two side regions of the flexible touch screen, and wherein the step of manufacturing the second region can comprise: forming the second region in a central region of the flexible touch screen.

According to an embodiment, the first region comprises a double-layer conductive film or a single-layer conductive film having a cross bridge structure; and the second region comprises a single-layer conductive film.

DETAILED DESCRIPTION OF THE EMBODIMENTS

Figure 1:
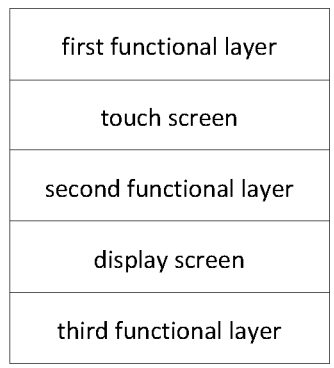
FIG. 1 schematically shows a stack structure of a display screen.

In the following, respective exemplary embodiments of the present application will be described in detail with reference to the drawings. These embodiments are provided in order to enable the present application to be thorough and complete, and communicate the scope and concept of the present application to a skilled person in the art completely, rather than limiting the concept of the present application to these embodiments. For the sake of clarity, shapes and sizes of the elements can be exaggeratedly illustrated in the drawings.

For the convenience of description, the spatial relative terms such as "under", "above", "at the left side of", and "at the right side of" can be used in this text, so as to describe the relationship between one element or feature and another (some) element(s) or feature(s) as shown in the figure. It should be understood that the spatial relative terms aim to cover different orientations of the device in use or in operation other than the orientations as shown in the figures. For example, if the device is put upside down in the figure, the element that is described as "under other elements or features" will thus be orientated as "above other elements or features".

In addition, although terms such as "first" and "second" are used in various embodiments of the present application to describe a plurality of members, components, regions, layers and/or portions, these members, components, regions, layers and/or portions should not be limited by these terms. These terms are only used for distinguishing one member, component, region, layer or portion from another member, component, region, layer or portion. Therefore, the member, component, region, layer or portion that is called a first member, a first component, a first region, a first layer or a first portion in the embodiment can also be called a second member, a second component, a second region, a second layer or a second portion, without departing from the concept of the present application.

The present application proposes a flexible touch screen. The flexible touch screen comprises: a first region, the first region comprising touch electrodes and detection electrodes in a cross distribution, the first region being non-foldable; and a second region adjacent to the first region, the second region comprising touch electrodes and detection electrode in a parallel distribution, the second region being foldable.

The touch electrode can comprise a plurality of first electrodes, and a first conductive connector exists between adjacent first electrodes located in the same touch electrode. Similarly, the detection electrode can also comprise a plurality of second electrodes, and a second conductive connector exists between adjacent second electrodes located in the same detection electrode. The skilled person in the art should know how the touch electrode and the detection electrode are formed, which will not be repeated here.

In the flexible touch screen according to the present application, because the second region comprises touch electrodes and detection electrodes in a parallel distribution, the flexible touch screen of the present application may not be damaged easily when being bended.

The present application further proposes a flexible display screen, comprising the flexible touch screen according to the present application.

The present application further proposes a display method for the flexible display screen according to the present application. The flexible display screen comprises a foldable region arranged in a central portion and non-foldable regions arranged at two sides, and the foldable region comprises touch electrodes and detection electrode in a parallel distribution. The display method comprises: when the flexible display screen is not bended, the flexible display screen performing a full screen display, and when the flexible display screen is bended, at least one of the non-foldable regions arranged at two sides not performing display.

The present application further proposes a display device, comprising the flexible display screen according to the present application.

The present application further proposes a method for manufacturing a flexible touch screen, comprising steps of: manufacturing a first region, the first region comprising touch electrodes and detection electrodes in a cross distribution, the first region being non-foldable; and manufacturing a second region adjacent to the first region, the second region comprising touch electrodes and detection electrode in a parallel distribution, the second region being foldable.

The flexible display screen according to the present application is divided into a foldable region and non-foldable regions, and the foldable region comprises touch electrodes and detection electrodes in a parallel distribution. Therefore, when the flexible display screen according to the present application is folded, the case where the foldable region is damaged may not occur easily. Moreover, when the flexible display screen according to the present application is bended, at least one of the non-foldable regions arranged at two sides can perform no display. Thus, electric power can be saved further.

FIG. 1 schematically shows a stack structure of a display screen.

As shown in FIG. 1, the stack structure of the flexible display screen can comprise, for example, a first functional layer, a touch screen, a second functional layer, a display screen, and a third functional layer.

The first functional layer is the uppermost layer facing the user, which can be a protective layer having functions such as anti-scratch, anti-reflection and anti-oil pollution etc. The first functional layer can protect the flexible display screen from being scratched, reduce reflection, and protect it from being polluted by fingerprint or oil.

The touch screen can be located beneath the first functional layer for implementing the touch function. The second functional layer can be located beneath the touch screen, and can be a layer having the anti-reflection function (such as a circular polarizer), or can be a bonding layer having the function of bonding the touch screen and the display screen.

The display screen can be located beneath the second functional layer, and can comprise an AMOLED, electronic paper or a reflective-type of liquid crystal device, and a driving circuit thereof. The third functional layer can be located beneath the display screen, and is a protective layer at the lowest layer. The third functional layer can be made from a film material having a supporting function, and can have functions such as heat dissipation, anti-static electricity, and anti-electromagnetic interference.

Although the exemplary stack structure of the flexible display screen shown in FIG. 1 comprises a first to a third functional layer as well as a touch screen and a display screen arranged between respective functional layers, the present application is not limited to this. When required, the skilled person in the art can, arrange functional layers for implementing other functions in the flexible display screen or allow the function implemented by at least one of the functional layers to be achieved by the touch screen and/or the display screen. The technical solution of the present application aims to cover all possible modifications and alterations.

Figure 2:
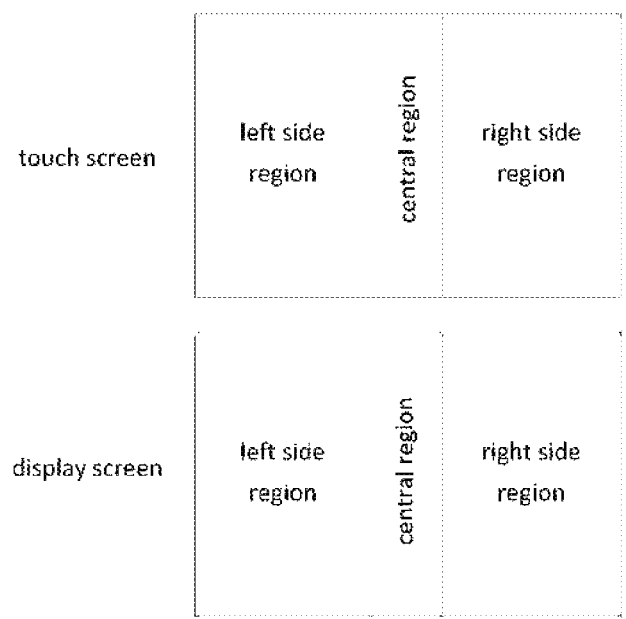
FIG. 2 schematically shows a structure of a flexible display screen according to an embodiment of the present application.

FIG. 2 schematically shows a structure of a flexible display screen according to an embodiment of the present application.

As shown in FIG. 2, according to an embodiment of the present application, the touch screen is divided into a left side region, a central region and a right side region. Correspondingly, the display screen is also divided into a left side region, a central region and a right side region corresponding to the touch screen. The left side region of the display screen corresponds to the left side region of the touch screen, the central region of the display screen corresponds to the central region of the touch screen, and the right side region of the display screen corresponds to the right side region of the touch screen. The left side region and the right side region can be called side regions.

In FIG. 2, the left side region and the right side region of the touch screen can also be called a first region, and the central region of the touch screen can also be called a second region. According to an embodiment of the present application, the first region of the touch screen is a non-foldable region, while the second region of the touch screen is a foldable region.

Although FIG. 2 schematically shows that the left side region and the right side region have the same area, the present application is not limited to this. The skilled person in the art can set areas of the first region and the second region arbitrarily as needed. In addition, although FIG. 2 schematically shows that one second region is arranged between two first regions, the present application is not limited to this. The skilled person in the art can set the number of the first region and the second region arbitrarily as needed.

Figure 3:
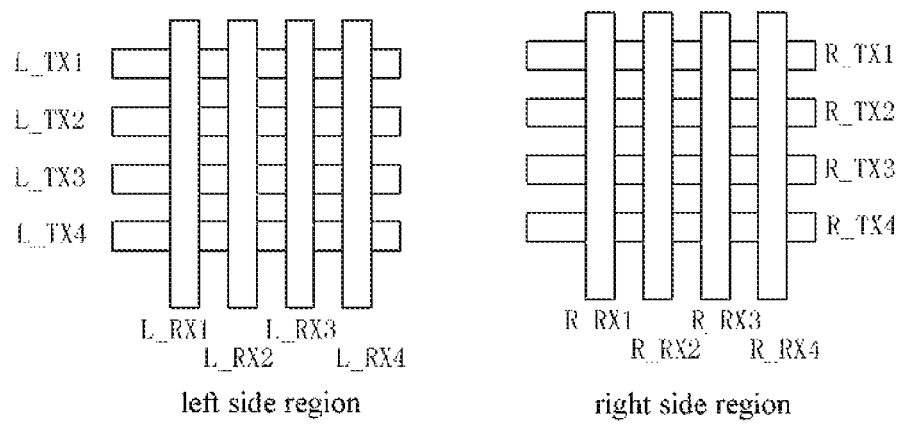
FIG. 3 schematically shows a structure of a first region of a flexible touch screen according to an embodiment of the present application.

FIG. 3 schematically shows a structure of a first region of a flexible touch screen according to an embodiment of the present application.

As shown in FIG. 3, the first region of the flexible touch screen according to an embodiment of the present application can comprise a left side region and a right side region. The first region can comprise a double-layer conductive film. The touch electrodes TX are located in one layer of the conductive film, and the detection electrodes RX are located in the other layer of the conductive film. Moreover, wirings of the touch electrodes TX and the detection electrodes RX are perpendicular to each other.

Specifically, in the left side region, wirings of the touch electrodes L_TX1, L_TX2, L_TX3, L_TX4 . . . and the detection electrodes L_RX1, L_RX2, L_RX3, L_RX4 . . . are perpendicular to each other. Similarly, in the right side region, wirings of the touch electrodes R_TX1, R_TX2, R_TX3, R_TX4 . . . and the detection electrodes R_RX1, R_RX2, R_RX3, R_RX4 . . . are perpendicular to each other.

The left side region and the right side region can be designed independently. The left side region and the right side region of the same size or of different sizes can be chosen based on the requirements for the screen resolution and the touch performance. The conductive material for manufacturing the first region in the touch screen can be ITO, silver nanowire, metal, carbon nanotube, and graphene etc.

It is only an exemplary embodiment that the first region of the touch screen has a double-layer conductive film, and the present application is not limited to this. Alternatively, the first region of the touch screen can also use a single-layer conductive film having a cross bridge structure.

Figure 4:
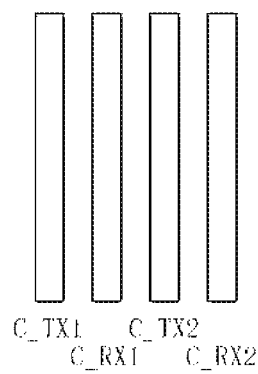
FIG. 4 schematically shows a structure of a second region of a flexible touch screen according to an embodiment of the present application.

FIG. 4 schematically shows a structure of a second region of a flexible touch screen according to an embodiment of the present application.

As shown in FIG. 4, the second region of the flexible touch screen according to an embodiment of the present application can comprise a single-layer conductive film. The single-layer conductive film is provided with touch electrodes and detection electrodes in a parallel distribution.

According to an embodiment of the present application, the second region can be located in a central area of the touch screen. The second region can be located in a foldable region of the flexible touch screen, and an extending direction of the touch electrodes TX and the detection electrodes RX in the second region can be parallel to a bending axis of the foldable region.

Figure 5:
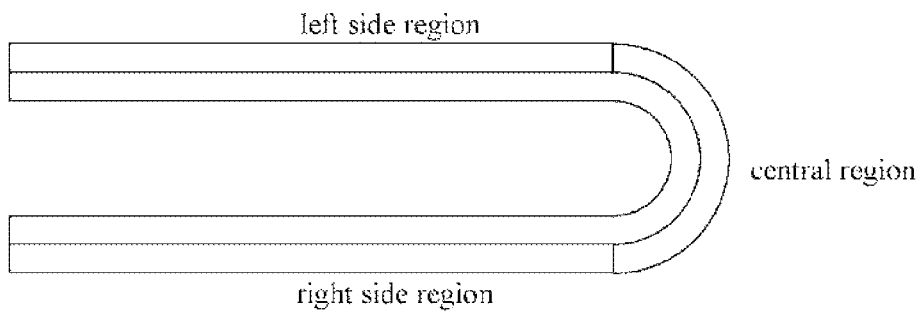
FIG. 5 schematically shows a sectional view of a flexible display screen according to an embodiment of the present application in a folded state.

FIG. 5 schematically shows a sectional view of a flexible display screen according to an embodiment of the present application in a folded state.

As shown in FIG. 5, the flexible display screen is in a folded state, and the folded region is located in the second region. The second region can be set to be slightly larger than the folded region, and can also be set to the equal to or smaller than the folded region under actual conditions. Moreover, according to the design of product, the left region of the flexible display screen can have a same area as or a different area from the right side region.

Figure 6:
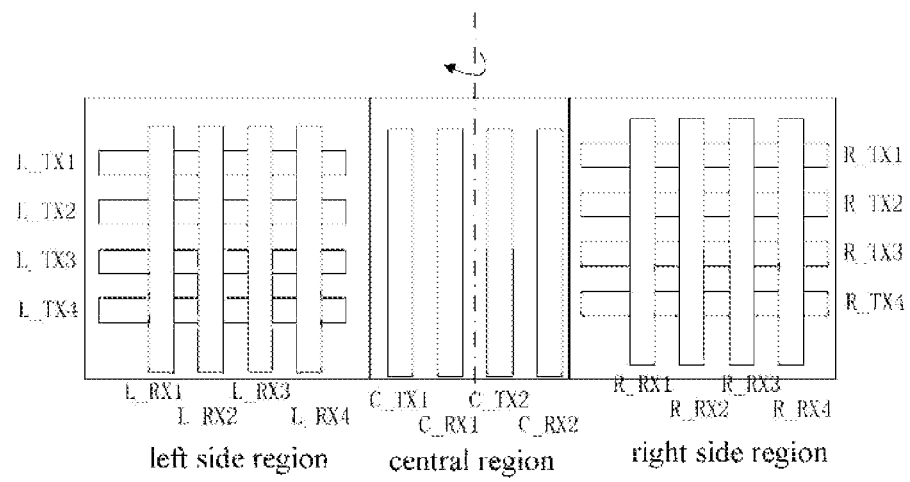
FIG. 6 schematically shows a structure of a flexible touch screen according to an embodiment of the present application.

FIG. 6 schematically shows a structure of a flexible touch screen according to an embodiment of the present application.

As shown in FIG. 6, the second region located at the center of the flexible touch screen comprises a structure of single-layer conductive film. The single-layer conductive film is provided with touch electrodes and detection electrodes in a parallel distribution. Moreover, extending directions of the touch electrodes C_TX1, C_TX2 and the detection electrodes C_RX1, C_RX2 in the second region is parallel to the bending axis of the foldable region of the flexible touch screen.

In the flexible touch screen according to the present application, the touch electrodes and the detection electrodes arranged in the single-layer conductive film of the second region of the touch screen are arranged to be parallel to each other, and the extending direction thereof is parallel to the bending axis of the foldable region of the flexible touch screen. Therefore, when the flexible display screen according to the present application is folded, the case where the foldable region is damaged may not occur easily.

According to an embodiment of the present application, when the flexible display screen is not bended, the flexible display screen can perform a full screen display, and when the flexible display screen is bended, at least one of the non-foldable regions (i.e., the first region) arranged at two sides can perform no display.

In an embodiment, when the flexible display screen is bended, one of the non-foldable regions (e.g., the right side region) arranged at two sides does not perform display, but the other of the non-foldable regions (e.g., the left side region) arranged at two sides and the foldable region arranged in the central portion keep displaying, and all displayed contents in the full screen display are remapped to a portion of the flexible display screen that keeps displaying.

In another embodiment, when the flexible display screen is bended, neither of the non-foldable regions arranged at two sides performs display, and the foldable region arranged in the central portion keeps displaying.

Figure 7:
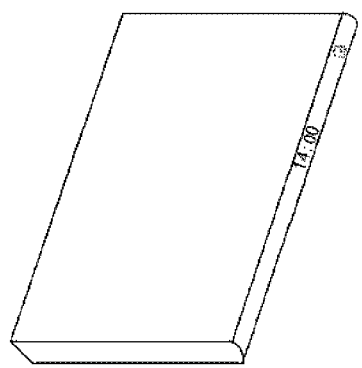
FIG. 7 schematically shows a working state of a flexible display screen according to an embodiment of the present application when being bended.

FIG. 7 schematically shows a working state of a flexible display screen according to an embodiment of the present application when being bended.

As shown in FIG. 7, when neither of the left side region and the right side region performs display, only the central region performs display. Here, touch functions of the left side region and the right side region can also be turned off, so as to realize a further power saving operation.

In addition, when the flexible display screen is in a non-folded state, the first region (e.g., including the left side region and the right side region) and the second region (e.g., the central region) can read out the coordinate positions of touch points in respective regions, and feed them back to a control unit (not shown). The control unit maps the coordinates of touch points from the first region and the second region respectively to the coordinate system of the whole display screen, so as to form the coordinate positions of touch points on the whole display screen.

When the flexible display screen is in a folded state, different from the example as shown in FIG. 7, one part of the screen can be turned off, while the other part of the screen can keep displaying. For example, when the display screen is in the folded state, the left side region and the central region perform display, while the right side region does not perform display. Here, the touch function of the right side region can be turned off, i.e., the touch electrodes TX/the detection electrodes RX stop scanning. Thus, it allows power saving. Here, the coordinates of touch points of the left side region and the central region are remapped to the display screen, so as to obtain the coordinate positions of the corresponding touch points. Alternatively, when a part of the screen is turned off, no zooming is performed on the display screen. For example, the left side region can serve as the main display region, and the central region can serve as an independently controlled central display region for implementing additional functions. For example, the central display region can display time or customized information and so on.

The flexible display screen according to the present application can carry out various display solutions in the folded state as needed, and shows flexibility. When the flexible display screen according to the present application is bended, at least one of the non-foldable regions arranged at two sides can perform no display. Hence, it can save power further.

Although the embodiments according to the present application have been illustrated and explained, the ordinary skilled person in the art should understand that various modifications can be made to these exemplary embodiments in forms and details, without departing from the spirit, scope and concept of the present application as defined by the claims as attached.

The invention claimed is:

1. A flexible touch screen, comprising:
   a first region, the first region comprising touch electrodes and detection electrodes in a cross distribution, the first region being non-foldable; and
   a second region adjacent to the first region, the second region comprising touch electrodes of the second region and detection electrodes of the second region, the second region being foldable;
   wherein both an extending direction of the touch electrodes of the second region and an extending direction of the detection electrodes of the second region are parallel to a bending axis of the second region.

2. The flexible touch screen according to claim 1, wherein the second region is located in a foldable region of the flexible touch screen.

3. The flexible touch screen according to claim 2, wherein the first region is located in two side regions of the flexible touch screen, and the second region is located in a central region of the flexible touch screen.

4. The flexible touch screen according to claim 1, wherein the first region comprises a double-layer conductive film or a single-layer conductive film having a cross bridge structure; and the second region comprises a single-layer conductive film.

5. The flexible touch screen according to claim 1, wherein the touch electrodes and the detection electrodes in the first region are distributed perpendicular to each other.

6. The flexible touch screen according to claim 1, wherein a material of the touch electrode or the detection electrode is one or combination of tin indium oxide, silver nanowire, metal, carbon nanotube, and graphene.

7. A flexible display screen, comprising the flexible touch screen according to claim 1.

8. A display device, comprising the flexible display screen according to claim 7.

9. The flexible display screen according to claim 7, wherein
the second region is located in a foldable region of the flexible touch screen.

10. The flexible display screen according to claim 9, wherein
the first region is located in two side regions of the flexible touch screen, and the second region is located in a central region of the flexible touch screen.

11. The flexible display screen according to claim 7, wherein
the first region comprises a double-layer conductive film or a single-layer conductive film having a cross bridge structure; and
the second region comprises a single-layer conductive film.

12. The flexible display screen according to claim 7, wherein
the touch electrodes and the detection electrodes in the first region are distributed perpendicular to each other.

13. A display method for a flexible display screen, wherein the flexible display screen comprises a foldable region arranged in a central portion and non-foldable regions arranged at two sides, the foldable region comprising touch electrodes of the foldable region and detection electrodes of the foldable region, both an extending direction of the touch electrodes of the foldable region and an extending direction of the detection electrodes of the foldable region being parallel to a bending axis of the foldable region, and the display method comprises:

when the flexible display screen is not bended, the flexible display screen performing a full screen display, and
when the flexible display screen is bended, at least one of the non-foldable regions arranged at two sides not performing display.

14. The display method according to claim 13, wherein
when the flexible display screen is bended, one of the non-foldable regions arranged at two sides does not perform display, but the other of the non-foldable regions arranged at two sides and the foldable region arranged in the central portion keep displaying, and
all displayed contents in the full screen display are remapped to a portion of the flexible display screen that keeps displaying.

15. The display method according to claim 13, wherein
when the flexible display screen is bended, neither of the non-foldable regions arranged at two sides performs display, and the foldable region arranged in the central portion keeps displaying.

16. The display method according to claim 15, wherein,
the foldable region displays time or customized information.

17. A method for manufacturing a flexible touch screen, comprising steps of:
manufacturing a first region, the first region comprising touch electrodes and detection electrodes in a cross distribution, the first region being non-foldable; and
manufacturing a second region adjacent to the first region, the second region comprising touch electrodes of the second region and detection electrodes of the second region, the second region being foldable;
wherein both an extending direction of the touch electrodes of the second region and an extending direction of the detection electrodes of the second region are parallel to a bending axis of the second region.

18. The method according to claim 17, wherein the step of manufacturing the first region comprises:
arranging the touch electrodes and the detection electrodes in the first region to be perpendicular to each other.

\* \* \* \* \*